United States Patent
Kroh (10) Patent No.: US 11,739,736 B2
(45) Date of Patent: Aug. 29, 2023

(54) WIND POWER INSTALLATION AND METHOD FOR MONITORING AN AZIMUTH DRIVE OF THE WIND POWER INSTALLATION

(71) Applicant: Wobben Properties GmbH, Aurich (DE)

(72) Inventor: Uwe Kroh, Aurich (DE)

(73) Assignee: Wobben Properties GmbH, Aurich (DE)

( * ) Notice: Subject to any disclaimer, the term of this patent is extended or adjusted under 35 U.S.C. 154(b) by 8 days.

(21) Appl. No.: 17/171,448

(22) Filed: Feb. 9, 2021

(65) Prior Publication Data
US 2021/0246874 A1   Aug. 12, 2021

(30) Foreign Application Priority Data
Feb. 11, 2020   (DE) .......................... 102020103401.6

(51) Int. Cl.
*F03D 80/70*   (2016.01)
*F03D 17/00*   (2016.01)

(52) U.S. Cl.
CPC ............. *F03D 80/70* (2016.05); *F03D 17/00* (2016.05)

(58) Field of Classification Search
CPC ................................ F03D 17/00; F03D 80/70
See application file for complete search history.

(56) References Cited

U.S. PATENT DOCUMENTS

| | | | | |
|---|---|---|---|---|
| 4,239,977 | A * | 12/1980 | Strutman | F03D 7/028 416/41 |
| 8,008,797 | B2 * | 8/2011 | Simon | H02P 9/06 290/55 |
| 10,938,390 | B2 * | 3/2021 | Camacho Cardenas | F04D 29/18 |
| 2018/0372071 | A1 * | 12/2018 | Müller | F03D 80/70 |
| 2021/0123696 | A1 * | 4/2021 | Johnson | F04D 25/06 |

* cited by examiner

*Primary Examiner* — Courtney D Heinle
*Assistant Examiner* — John S Hunter, Jr.
(74) *Attorney, Agent, or Firm* — Seed Intellectual Property Law Group LLP (57) ABSTRACT

A wind power installation with an azimuth bearing having an azimuth gearing, and at least one azimuth drive, which is coupled to an azimuth gear mechanism corresponding to the azimuth gearing. The azimuth gear mechanism has a drive pinion which is rotatable about a pinion axis, wherein the drive pinion is configured to engage in the corresponding azimuth gearing of the azimuth bearing, wherein the pinion axis has a predefined reference orientation. The wind power installation comprises at least one sensor device which is configured to detect a deviation of the orientation of the pinion axis relative to the reference orientation.

22 Claims, 7 Drawing Sheets

WIND POWER INSTALLATION AND METHOD FOR MONITORING AN AZIMUTH DRIVE OF THE WIND POWER INSTALLATION

BACKGROUND

Technical Field

The invention concerns a wind power installation and a method for monitoring an azimuth drive of a wind power installation.

Description of the Related Art

Wind power installations are generally known. They have a tower on which a nacelle is mounted rotatably. This mounting is usually called the azimuth bearing. Depending on installation type, the wind power installation has a plurality of azimuth drives. These are configured to enable the nacelle to track the wind and to orient the rotor correctly even when the wind direction changes.

An azimuth drive has a drive motor which normally drives a drive shaft via an azimuth gear mechanism. A drive pinion, which is floatingly mounted on a lower pinion shaft bearing, is arranged on the drive shaft. The drive usually rotates rapidly with low torque and the drive shaft rotates slowly with high torque. The high torque is then transmitted by the drive shaft via the drive pinion, i.e., a small gear wheel, to a large gear wheel, for example an internal gearing of the azimuth bearing, in the region of a transition between the tower and the nacelle, in order to move the nacelle horizontally through an azimuth angle. To adjust the nacelle, accordingly a high drive moment is transmitted.

Also, during operation of a wind power installation in turbulent winds, depending on the orientation of the rotor relative to the direction of the inflowing wind, very high forces occur. In certain operating situations, excessively high and frequent load peaks may occur in the azimuth drives.

Because of its mounting and high loads, in operation the drive pinion tends to move laterally away, i.e., to bend away, from the azimuth gearing, out of its normal orientation which is referred to below as the reference orientation. Under certain unfavorable circumstances, over time this may lead to wear on the pinion shaft bearing, whereby the drive pinion may be deflected out of its ideal position, i.e., that with an intact bearing. A defective pinion shaft bearing means that the pinion shaft of the azimuth gear mechanism can no longer be guided play-free. After reaching a certain deflection, accordingly it is no longer easily possible for the gearing of the drive pinion to engage in the corresponding gearing of the azimuth bearing. This leads to an uneven load distribution within the gearing between the azimuth gear mechanism and the azimuth gear ring, whereby both the drive and the drive pinion may be exposed to increased multiple load peaks from time to time. Accordingly, a tooth breakage may occur inside the azimuth gearing or drive pinion.

If damage to the pinion shaft bearing is detected at an early stage, only the bearing and/or the defective azimuth gear mechanism need be replaced. As soon as the defective gear mechanism also causes damage to the azimuth gearing, long downtimes and high repair cost result, since usually replacement of the entire azimuth bearing is unavoidable and the wind power installation would be shut down for a long period.

BRIEF SUMMARY

A first aspect of the invention concerns a wind power installation with an azimuth bearing having an azimuth gearing, and at least one azimuth drive which is coupled to an azimuth gear mechanism corresponding to the azimuth gearing, wherein the azimuth gear mechanism has a drive pinion which is rotatable about a pinion axis, wherein the drive pinion is configured to engage in the corresponding azimuth gearing of the azimuth bearing, wherein the pinion axis has a predefined reference orientation.

In a second aspect, the invention furthermore concerns a method for monitoring an azimuth drive of a wind power installation, preferably a wind power installation of the type cited initially.

Provided are techniques for improving a wind power installation of the type cited initially such that the disadvantages found in the prior art can be eliminated or reduced. In particular, provided are techniques for improving a wind power installation such that damage and/or wear on the pinion shaft bearing can be detected as early as possible, and hence the risk of serious damage to the azimuth gearing and failure of the azimuth drive can be reduced or prevented, but at least downtimes and repair costs can be minimized.

In a first aspect, provided is a wind power installation of the type cited initially, wherein the wind power installation comprises at least one sensor device which is configured to detect a deviation of the orientation of the pinion axis relative to the reference orientation. The word "detect" according to the disclosure means that a sensor monitors the orientation of the pinion axis directly or indirectly. This means that a sensor, which for example monitors the movement of an end face of the drive pinion caused by a deflection of the pinion axis, thus also detects a deflection of the pinion axis. Furthermore, a reference orientation is an orientation of the pinion axis of the drive pinion in mounted state when the wind power installation is stationary. By means of the orientation of the pinion axis of the drive pinion, a conclusion can be drawn on the state of the bearing of the drive pinion. In the case of a defective bearing of the drive pinion, its pinion axis would shift beyond a limit value with respect to a reference orientation. This would lead to a defective engagement of the gearing of the drive pinion in the corresponding gearing of the azimuth bearing. This in turn leads to damage to the gearing in the short or long term. In the case of damage to the gearing of a drive, an optimal and even force transmission cannot be guaranteed, so that other azimuth drives must in some cases absorb increased load peaks, jeopardizing the gearing engagement there. In this way, further teeth breakages can occur on other drives (consequential damage).

Preferably, the sensor device comprises an inductive sensor and/or a mechanical sensor. It is provided that a sensor device is used for each drive pinion for monitoring the orientation of the pinion axis. In some cases it may be useful to use several sensor devices per drive pinion. This may be achieved with the same sensor types or different sensor types. The same sensor types have the advantage of simple maintenance and control. With different sensor types, the risk of simultaneous failure of both sensor types is lowered. Also, the comparability and reliability of the detected values is increased since incorrect measurements can be detected more easily.

By means of inductive sensors, electrically conductive materials, i.e., for example metallic materials, can be detected. Because of their insensitivity to environmental influences, it is possible to achieve a high measurement accuracy even in a dusty atmosphere or under vibration and shaking.

By means of mechanical sensors, all types of materials can be detected. The function and measurement accuracy are less influenced by the surface of an object to be measured. In particular, touch sensors are often protected by a housing so that the signal transmission is not influenced for example by swarf, dust, oil or also magnetic fields and brightness. The mechanical sensor may be a touch sensor or also a stop sensor. As the name suggests, a touch sensor is a sensor which tactilely detects the position of a workpiece. A stop sensor or end position switch emits a signal when the workpiece to be measured has reached the corresponding stop or end position.

According to a preferred refinement, the sensor device is configured to detect in noncontact fashion a deviation of the orientation of the pinion axis relative to the reference orientation. With noncontact detection, in particular of a distance from a measurement object or a position of a measurement object, there is no mechanical wear on the sensor. Accordingly, longer maintenance intervals are required. Furthermore, noncontact sensors have a lower susceptibility to failure under vibrations.

Preferably, the sensor device is configured to tactilely detect a deviation of the orientation of the pinion axis relative to the reference orientation. Tactile sensors, also called contact sensors, react to mechanical contact and may convert this into binary, analog or digital signals.

In a further preferred embodiment, the sensor device comprises a digital sensor, in particular a binary sensor. According to the invention, binary sensors are sensors which convert a discrete physical measurement value into a binary signal. Binary sensors distinguish between two states, i.e., for example whether or not the position to be determined of the detected object has been assumed. The binary signal transmission allows rapid and compact signal processing, since the digital links sample only the binary state of the input. Furthermore, only a low precision loss is to be expected since there are only two possible states.

It is furthermore preferred that the sensor device comprises an analog sensor. According to the invention, analog sensors are sensors which convert a physical measurement value into an analog signal, i.e., for example an electrical analog signal such as a voltage or current. The advantage of an analog data acquisition would be a greater and hence more precise resolution range. In this way, a higher information density can be acquired and hence for example a pre-evaluation performed in the sensor itself. In comparison with binary sensors, the sensitivity to external influences is greater. In a further embodiment, accordingly it is also proposed to use several sensor types, i.e., binary and analog sensors, in the wind power installation in order to detect a deviation of the orientation of the pinion axis.

In a further preferred embodiment, the sensor device is configured to detect the deviation of the orientation of the pinion axis relative to the reference orientation on the basis of a position change of a reference geometry associated with the drive pinion.

A reference geometry is preferably selected from at least a part portion of the drive pinion, preferably selected from one of the following: the gearing of the drive pinion, in particular also portions of the gearing of the drive pinion, i.e., a tooth or several teeth; one or more tooth flanks; a tip diameter, in particular the tip faces of a tooth, or a root diameter; at least a part portion of the end face of the drive pinion, preferably a portion inside the root diameter of the drive pinion or a portion inside the face delimited by the root diameter and the tip diameter of the drive pinion; or the casing surface of the pinion shaft.

On detection of at least a part portion of the gearing, in particular one or more tooth flanks of the drive pinion, in particular a position change of the gearing relative to the reference orientation can be determined. On detection of at least a part portion of the end face of the drive pinion, in particular an angle change of the pinion axis relative to the reference orientation can be determined. From the selected reference geometry, a reference point may be selected and determined, in particular the center point of the tip diameter and/or the root diameter on the basis of a respective radius of the tip diameter/root diameter of the drive pinion.

Preferably, the sensor device comprises a distance sensor for measuring a distance between the reference geometry and the sensor device. When measuring a distance, continuous measurement values may be recorded. Thus fluctuations in the distance may be evaluated better, so that for example noise in the measurement results triggered by vibrations in operation can be filtered out. Amongst others, this allows investigation and evaluation of the change in distance over a longer period, in particular also investigation and evaluation of the distance for different load cases and different ambient conditions.

In a further preferred embodiment, the sensor device comprises a proximity sensor for detecting a position, in particular a limit position, of the reference geometry. This sensor variant constitutes a simpler measurement device. Two states are detected, wherein the sensor device transmits a failure signal in the second state, i.e., when the reference geometry has reached or exceeded a defined limit position.

Preferably, the wind power installation has a machine carrier and the sensor device is arranged on the machine carrier of the wind power installation.

It is furthermore preferred that the drive pinion has a pinion shaft which is mounted on a lower pinion shaft bearing, and the sensor device is positioned between the pinion shaft bearing and the drive pinion, preferably between the pinion shaft bearing and an end face of the drive pinion, in particular a part of the end face inwards of the root diameter, and is oriented onto the drive pinion or a casing surface of the pinion shaft. In a further embodiment, it is provided that the sensor device is arranged between the pinion shaft bearing and the drive pinion and oriented onto a casing surface of the pinion shaft. To detect a movement or deflection of the end face of the drive pinion, an inductive sensor may be used. The inductive sensor may be oriented both onto a full face, i.e., a face inwards of the root diameter of the drive pinion, and also for example onto the gearing of the drive pinion. A further possible embodiment concerns the use of a mechanical sensor. Preferably, the switch logic is applied such that the sensor device transmits a failure signal on contact in particular with the end face or casing surface of the drive pinion.

In a further preferred embodiment, the at least one sensor device is positioned horizontally spaced from the tip diameter of the drive pinion. In this position, preferably an inductive sensor or a mechanical sensor is used. The sensor devices are each configured to monitor a deflection of the gearing. Here, the size of the field to be monitored is preferably selected such that several teeth or several tooth flanks serve as a reference geometry. Particularly preferably, two inductive sensor devices are used for monitoring the orientation of the pinion axis, wherein a first sensor and a second sensor are positioned such that in operation, i.e., on rotation of the pinion about a pinion axis, always at least one tooth lies in the measurement range of at least one sensor.

Preferably, the sensor device is arranged below the drive pinion and is oriented onto the drive pinion, in particular a part of an end face inside the root diameter of the drive pinion. To detect a movement or deflection of the end face of the drive pinion, an inductive sensor may be used. The inductive sensor may be oriented both onto a full face, i.e., a face inwards of the root diameter of the drive pinion, and also for example onto the gearing of the drive pinion. A further possible embodiment concerns the use of a mechanical sensor. Preferably, the switch logic is applied such that the sensor device transmits a failure signal on loss of contact, in particular with the end face of the drive pinion.

In a preferred embodiment, the wind power installation has a controller which is configured to detect a deviation of the orientation of the pinion axis relative to the reference orientation, which deviation is indicative of the presence of a failure.

It should be understood that the preferred embodiments and advantages of the wind power installation are also preferred embodiments and advantages of the method according to the second aspect, so to avoid repetition, reference is made to the statements above.

The object is achieved in a second aspect by a method for monitoring an azimuth drive of a wind power installation, preferably a wind power installation of the type cited initially, wherein the azimuth drive has a drive pinion which is rotatable about a pinion axis, wherein the pinion axis has a predefined reference orientation, wherein the method comprises the step: detecting by means of a sensor device, in particular in noncontact or tactile fashion, a deviation of the orientation of the pinion axis relative to the reference orientation.

Preferably, the method comprises the steps: establishing the reference orientation of the pinion axis by means of the sensor device, and/or predefining the reference orientation of the pinion axis and inputting the predefined reference orientation in the sensor device. It is possible, depending on the sensor type used, firstly to define a neutral position and input this into the sensor device, i.e., for example using a calibration function. Alternatively or additionally, it is provided to establish a reference orientation, for example the position or location of the pinion axis, by means of the sensor device and assign this as a reference position. In a further embodiment, the sensor device comprises a data interface and is configured to be programmed by means of the data interface, wherein preferably by means of the data interface, a dataset can be stored which is indicative of a previously established reference orientation of the pinion axis.

Preferably, the method furthermore comprises the step: detecting the deviation of the orientation of the pinion axis relative to the reference orientation from a position change of a reference geometry associated with the drive pinion. Preferably, the method furthermore comprises the step(s): converting a physical measurement value into a binary signal by means of the sensor device, and/or converting a physical measurement value into an analog signal by means of the sensor device. Furthermore preferably, the method comprises the step(s): measuring, by means of the sensor device, a distance between the reference geometry and the sensor device, and/or detecting a position of the reference geometry by means of the sensor device.

Preferably, the method furthermore comprises the step: generating a failure signal if a deviation of the orientation of the pinion axis of the drive pinion is detected which is indicative of the presence of a failure. The deviation of the orientation of the pinion axis of the drive pinion is determined by comparing the actual deviation of the orientation of the pinion axis of the drive pinion relative to a limit value which is indicative of the presence of a failure. This preferably takes place by means of the controller of the wind power installation. The sensor device here acts as a signal emitter. In an alternative embodiment, an evaluation may also be performed directly by a control device inside the sensor device itself.

Preferably, the method furthermore comprises the step(s): bringing the wind power installation to a park position, and/or shutting down the wind power installation. A wind power installation in particular comprises several azimuth drives. This creates the possibility of immediate failure elimination so as to exclude any operating failure.

Preferably, the method furthermore comprises the step: shutting down the azimuth drive coupled to the drive pinion by means of the controller if a deviation in the orientation of the pinion axis of the drive pinion is detected which is indicative of the presence of a failure. Depending on the amount of deviation of the orientation of the pinion axis, it may be useful to switch the drive pinion to an idle position. In this way, bringing to a park position can be guaranteed more safely before potential damage to the wind power installation, in particular the gearing of the drive pinion and/or the gearing of the azimuth bearing and/or the pinion shaft bearing, has been investigated and eliminated.

BRIEF DESCRIPTION OF THE SEVERAL VIEWS OF THE DRAWINGS

The disclosure is described below with reference to exemplary embodiments shown on the figures. The drawings show.

DETAILED DESCRIPTION

Mutually corresponding parts carry the same reference signs in all drawing figures.

Figure 1:
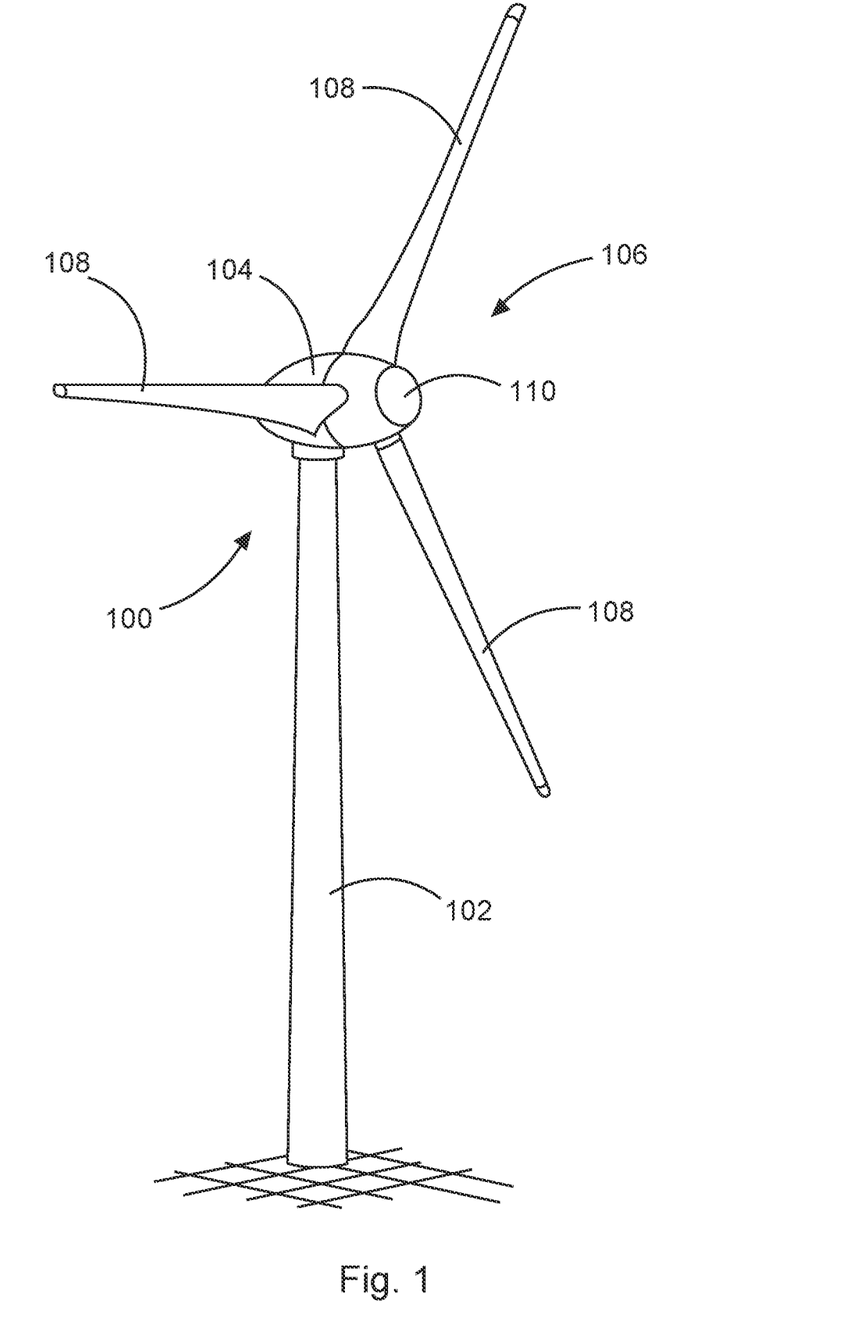
FIG. 1: a diagrammatic, perspective view of a wind power installation.

FIG. 1 shows a wind power installation 100 with a tower 102 and a nacelle 104. A rotor 106 with three rotor blades 108 and a spinner 110 is arranged on the nacelle 104. In operation, the rotor 106 is set in a rotary motion by the wind and thereby drives a generator 118 (FIG. 2) in the nacelle 104.

Figure 2:
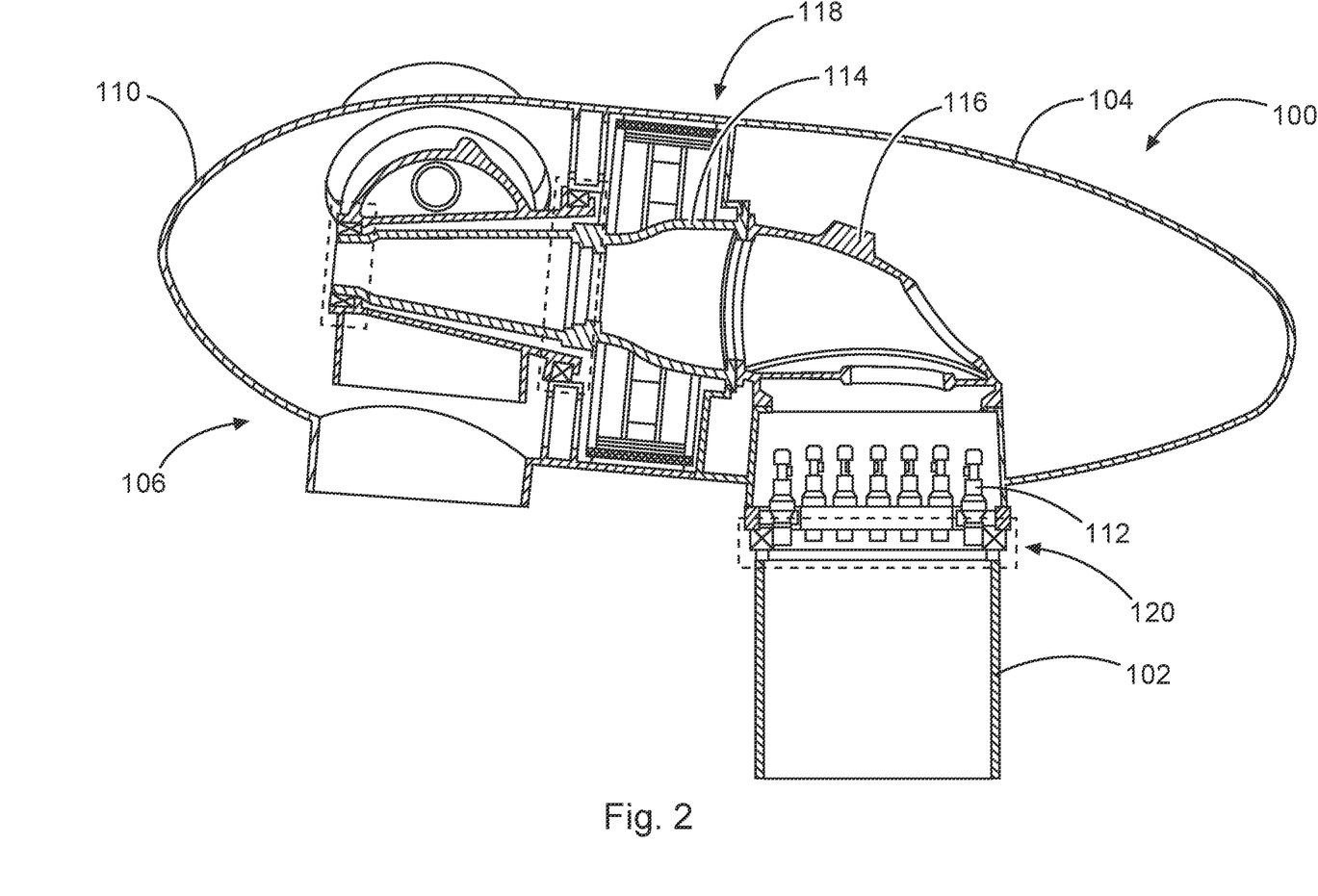
FIG. 2: a diagrammatic, partial sectional view of a nacelle of the wind power installation from FIG. 1, FIG. 3: a diagrammatic, partial sectional view of a carrier structure for receiving an azimuth drive according to FIG. 2, FIG. 4: a diagrammatic, partial sectional view according to FIG. 3 with sensor device.

The nacelle 104 of the wind power installation 100 according to FIG. 1 is shown diagrammatically in a partially sectional view in FIG. 2. The nacelle 104 is mounted on the tower 102 by means of an azimuth bearing 120 so as to be rotatable, and can be driven by means of an azimuth drive 112. A machine carrier 116, which carries a journal 114, is arranged in the nacelle 104.

Figure 3:
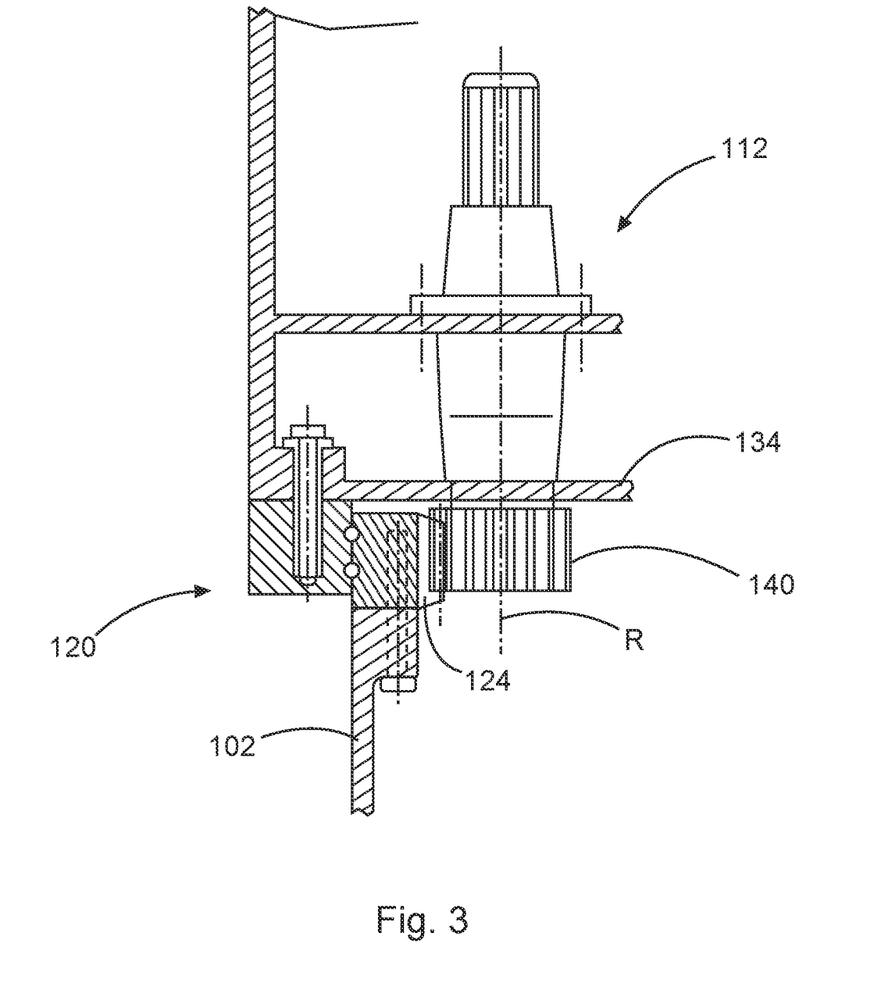

FIG. 3 shows as an example an azimuth drive 112 which is attached to a carrier structure 134 such that a drive pinion 140, formed on the respective azimuth drive 112 on the tower side, is actively connected to azimuth gearing 124. The drive pinion 140 is driven by means of a drive of the azimuth drive 112 and is configured to engage in a corresponding azimuth gearing 124 by means of a rotary motion about a pinion axis R.

FIG. 3 shows that the drive pinion 140 in this exemplary embodiment engages in an internal azimuth gearing 124. The azimuth drive 112 and the drive pinion 140 are oriented along a pinion axis R. In normal operation, this has a reference orientation.

Figure 4:
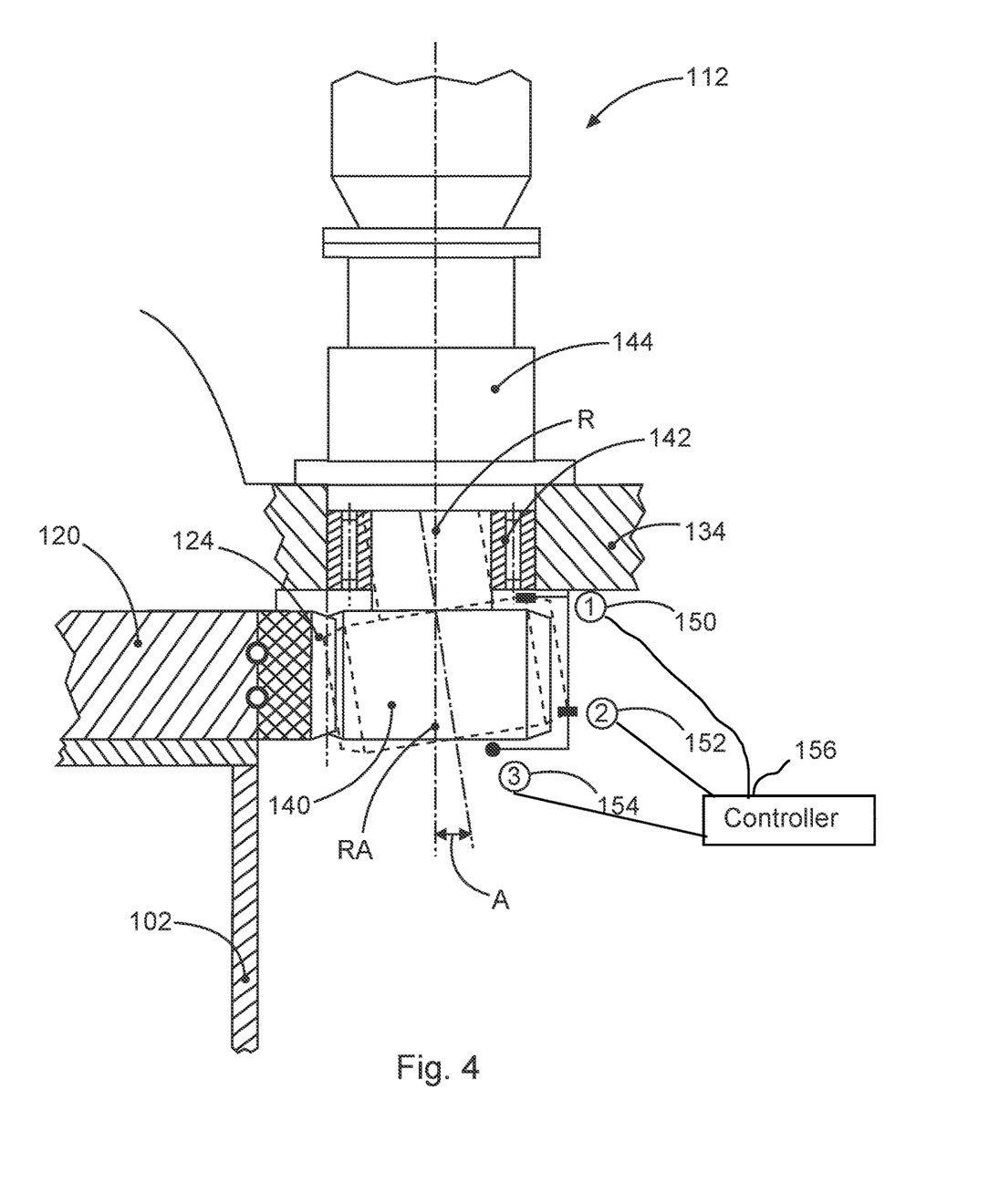

FIG. 4 shows the exemplary embodiment in FIG. 3, wherein three potential sensor positions (150, 152, 154) are shown, each coupled to a controller 156. It should be understood that in addition to the three sensor positions (150, 152, 154) shown, there are many further possible sensor positions in in accordance with the invention. Depending on reference geometry and wind power installation type, it may be useful to select a different sensor position from those shown in order to detect a deviation of the orientation of the pinion axis R of the drive pinion 140.

FIG. 4 also shows a drive pinion 140 which has been deflected out of its normal position. The pinion axis R has a deviation A in orientation relative to a reference orientation RA. The deviation may be a distance or an angle of the orientation of the pinion axis relative to a reference orientation.

Figure 5:
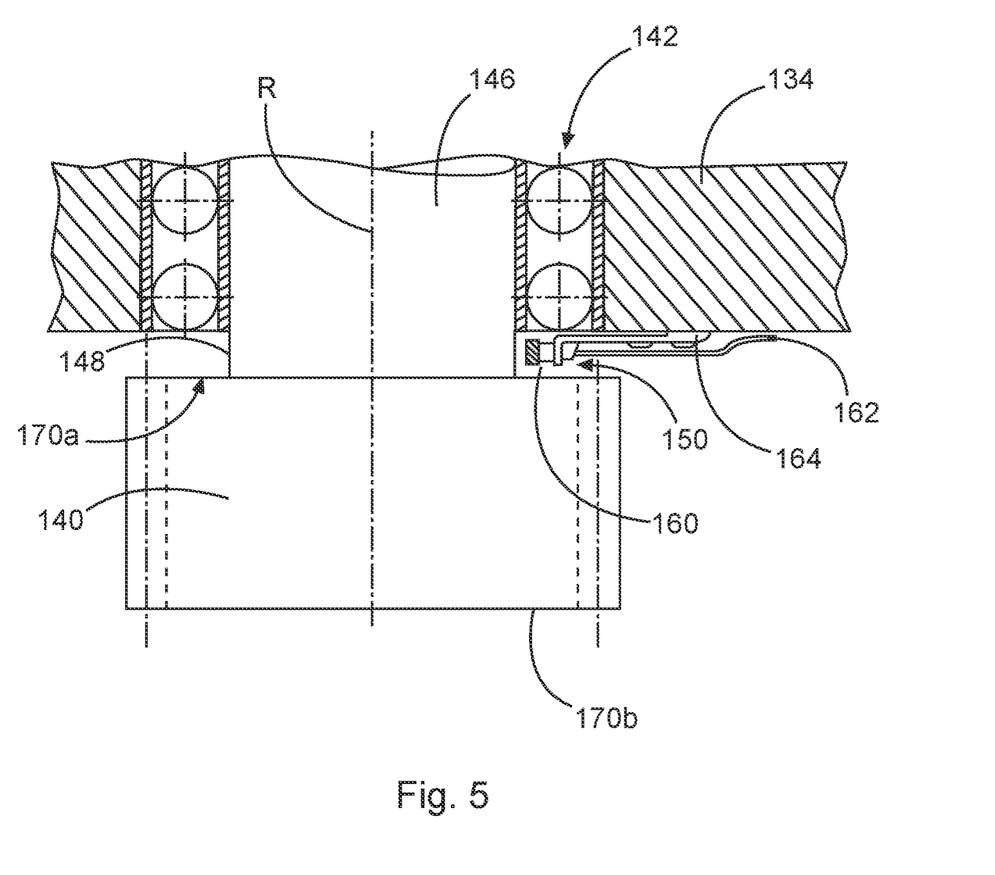
FIG. 5: a diagrammatic, detail depiction of the first sensor position according to FIG. 4, FIG. 6: a diagrammatic, detail depiction of the second sensor position according to XFIG. 4.

FIG. 5 shows the first sensor position 150 in a detail view. It is evident that the sensor 160 is attached to the carrier structure 134 by means of a first sensor holder 164. The sensor 160 is oriented onto the casing surface 148 of the pinion shaft 146. The sensor 160 is preferably a mechanical sensor or an inductive sensor. Preferably, the sensor has a distance from the casing surface 148 such that, on a deviation of the orientation of the pinion axis relative to a reference orientation which is indicative of the presence of a failure, it emits a failure signal to a controller (156 in FIG. 4) of the wind power installation 100. This deviation A (FIG. 4) is detected at the first sensor position 150, preferably tactilely, when a mechanical sensor is used. Here, the position of the sensor 160 and/or a distance between the sensor 160 and the casing surface 148 of the pinion shaft 146 defines a limit value. On a deviation of the orientation of the pinion axis which exceeds this limit value, a signal is transmitted to the controller of the wind power installation 100. In a further embodiment (not shown), the sensor 160 is arranged at the first sensor position 150, in particular between the pinion shaft bearing 142 and the drive pinion 140, and oriented onto the end face 170a. Preferably, it is oriented onto a part face of the end face 170a inwards of the root diameter 174 of the drive pinion 140.

Figure 6:
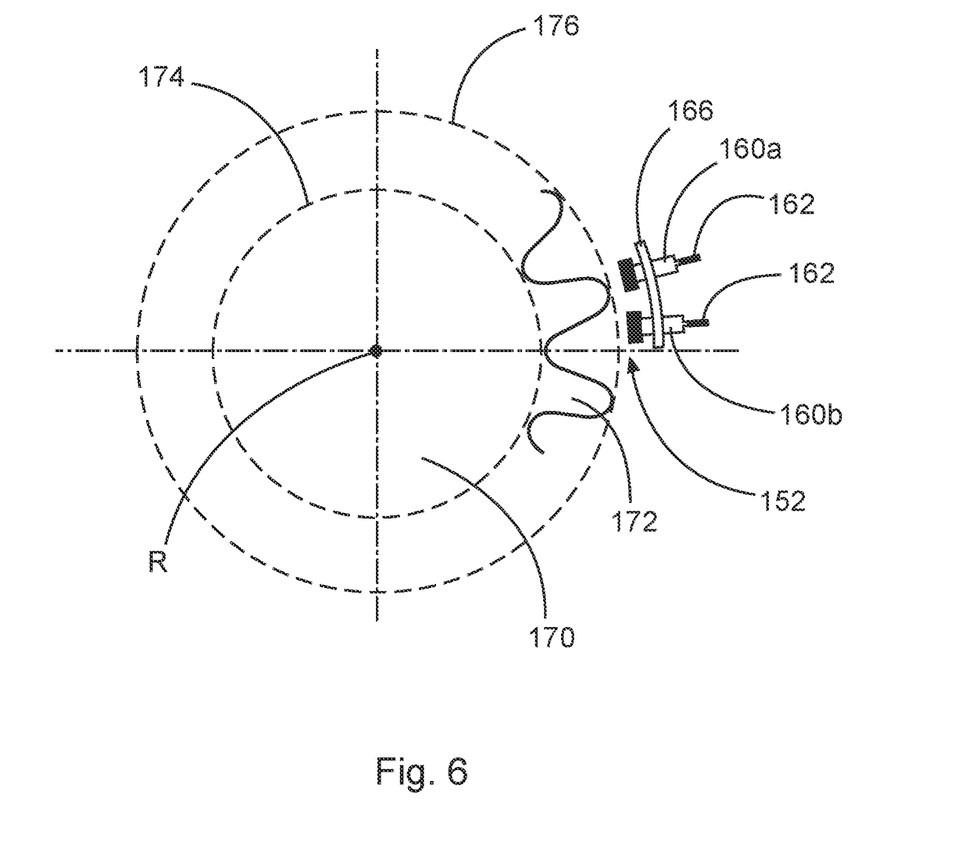

FIG. 6 shows the second sensor position 152 in a detail view, in particular a diagrammatic top view onto the end face 170 of the drive pinion 140. It is evident that a first sensor 160a and a second sensor 160b are arranged horizontally spaced from the tip diameter 176 of the gearing 172 of the drive pinion 140, and oriented towards the gearing 172. The first and the second sensor (160a, 160b) are arranged next to each other and attached to the carrier structure 134 by means of a second sensor holder 166. The first and the second sensor (160a, 160b) are oriented such that, on a rotary movement of the drive pinion 140 about the pinion axis R, at least one tooth of the gearing 172 always lies in the detection range of at least one sensor 160. On a deviation of the orientation of the pinion axis R, at least one of the sensors (160a, 160b) generates a signal. The signal is transmitted by means of a cable 162 to the controller (not shown) of the wind power installation 100.

Figure 7:
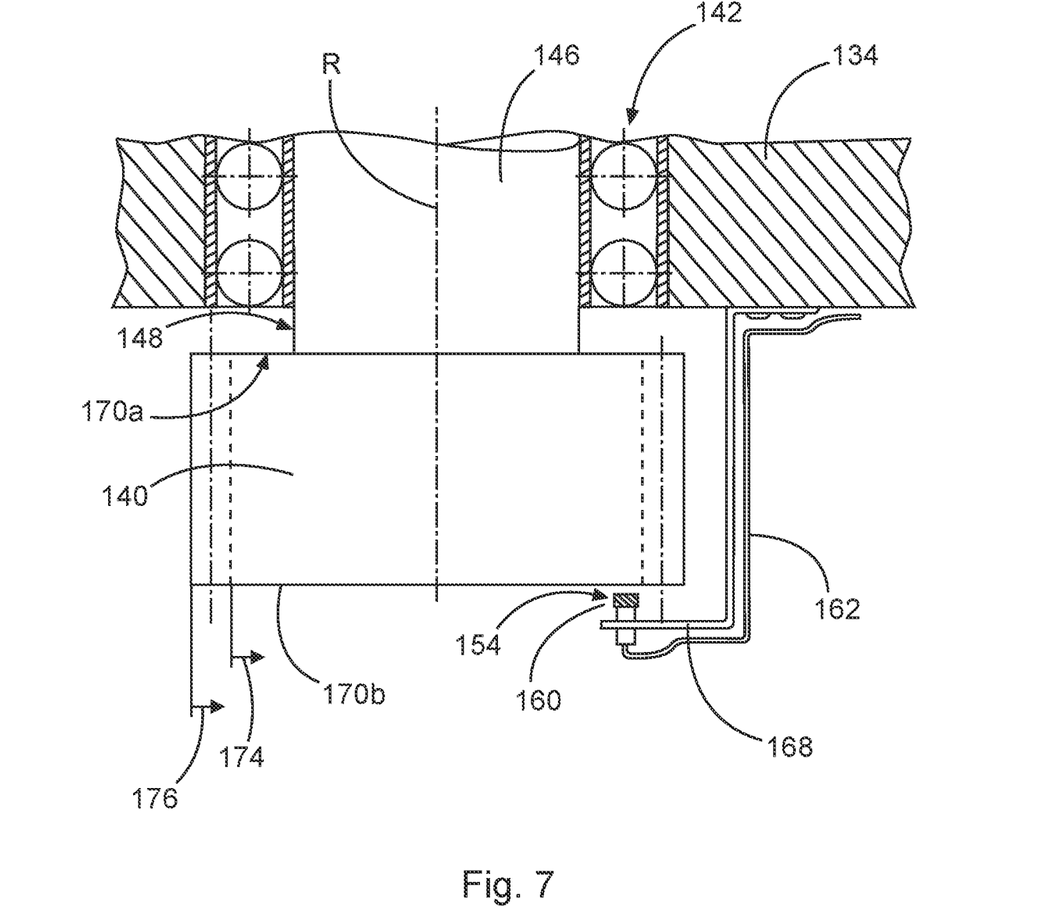
FIG. 7: a diagrammatic, detail depiction of the third sensor position according to FIG. 4.

FIG. 7 shows the third sensor position 154 in a detail view. It is evident that the sensor 160 is attached to the carrier structure 134 by means of a third sensor holder 168. The sensor 160 is oriented onto the lower end face 170b of the drive pinion 140. The sensor 160 is preferably a mechanical sensor or an inductive sensor. Preferably, on use of the sensor 160 which tactilely detects deviation, the sensor touches the lower end face 170b. Loss of contact would accordingly be indicative of the presence of a failure. On detection of a failure, the sensor 160 transmits a failure signal to a controller (not shown) of the wind power installation 100.

In a method for monitoring an azimuth drive 112 of the wind power installation 100, a sensor device 160 detects, in particular in noncontact or tactile fashion, a deviation of the orientation of the pinion axis relative to the reference orientation.

Detection firstly requires definition of a reference orientation. The reference orientation may be defined by predefinition and/or by establishing the reference orientation. The term predefinition according to the invention may mean, amongst others, that a sensor 160 is mounted at a specific position relative to or at a specific distance from the pinion axis RA. The starting position thus predefined, or the starting distance relative to the reference orientation, may thus be understood as a predefinition of the reference orientation of the pinion axis and inputting of the predefined reference orientation into the sensor device 160.

In an alternative embodiment, the reference orientation may be established by means of contact sensors 160, by creation of a physical contact with a reference geometry. For example, the sensor 160 may be positioned at the third sensor position 154 such that the sensor touches the end face 170b of the drive pinion 140. On loss of contact, the sensor 160 may transmit a failure signal to the controller of the wind power installation 100.

As soon as the orientation of the pinion axis deviates with respect to the reference orientation (FIG. 4), this may be detected by means of the sensors 160 by a position change of a reference geometry associated with the drive pinion 140. Here, the reference geometry at the first sensor position 150 is preferably the casing surface 148 of the pinion shaft 146 and/or a part portion of the end face 170a of the drive pinion 140. The reference geometry at the second sensor position 152 is preferably the gearing 172 of the drive pinion 140, in particular the tip face of a tooth, and/or the tip diameter 176 of the gearing 172. The reference geometry at the third sensor position 154 is preferably a part portion of the lower end face 170a of the drive pinion 140.

In a preferred embodiment, the sensors 160 convert a physical measurement value into a binary signal. In specific applications, for example for acquisition of a database, conversion of the physical measurement value into an analog signal or a digital signal by means of the sensor device 160 may be practically useful.

Furthermore, depending on sensor type, a distance between a reference geometry and the sensor device 160 and/or a position of a reference geometry may be established. If the sensor 160 has detected a deviation of the orientation of the pinion axis of the drive pinion 140 which is indicative of the presence of a failure, i.e., if a specific distance has been exceeded or not achieved, or if a position has been reached, the sensor 160 generates a failure signal. This is transmitted to the controller of the wind power installation 100.

On detection of a deviation of the orientation of the pinion axis of the drive pinion 140 which is indicative of the presence of a failure, the wind power installation 100 is brought to a park position and/or the entire wind power installation 100 is shut down. Bringing to a secure park position may comprise amongst others the following actions: the rotor blades 108 may be brought to a feathered position, i.e., a position of the rotor blades 108 which offers the minimum attack surface for the wind. Furthermore, the rotor 106 may be set into a free-running mode. In this operating mode, the rotor blades 108 are free in their movement about the rotor axis. Also, the azimuth angle of the nacelle 104 may be oriented into the wind direction.

LIST OF REFERENCE SIGNS

100 Wind power installation
102 Tower
104 Nacelle
106 Rotor
108 Rotor blades
110 Spinner
112 Azimuth drive
114 Journal
116 Machine carrier
118 Generator
120 Azimuth bearing
124 Azimuth gearing
134 Carrier structure
140 Drive pinion
142 Pinion shaft bearing
144 Azimuth gear mechanism
146 Pinion shaft
148 Casing surface of pinion shaft
150 First sensor position
152 Second sensor position
154 Third sensor position
160 Sensor (160a, 160b)
162 Cable from sensor to installation controller
164 Sensor holder for first sensor position
166 Sensor holder for second sensor position
168 Sensor holder for third sensor position
170 End face of drive pinion (170a, 170b)
172 Gearing of drive pinion
174 Root diameter of gearing
176 Tip diameter of gearing
R Pinion axis
RA Reference orientation
A Deviation The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation, comprising:
at least one sensor device;
an azimuth bearing having an azimuth gearing; and
at least one azimuth drive coupled to an azimuth gear mechanism corresponding to the azimuth gearing,
wherein the azimuth gear mechanism comprises a drive pinion rotatable about a pinion axis,
wherein the drive pinion is configured to engage in the corresponding azimuth gearing of the azimuth bearing,
wherein the pinion axis has a predefined reference orientation, and
wherein the at least one sensor device is configured to detect a deviation of an orientation of the pinion axis relative to the predefined reference orientation.

2. The wind power installation as claimed in claim 1, wherein the at least one sensor device is an inductive sensor.

3. The wind power installation as claimed in claim 1, wherein the at least one sensor device is configured to detect, in noncontact fashion, the deviation of the orientation of the pinion axis relative to the predefined reference orientation.

4. The wind power installation as claimed in claim 1, wherein the at least one sensor device is configured to tactilely detect the deviation of the orientation of the pinion axis relative to the predefined reference orientation.

5. The wind power installation as claimed in claim 1, wherein the at least one sensor device is at least one of a digital sensor, a mechanical sensor, or a binary sensor.

6. The wind power installation as claimed in claim 1, wherein the at least one sensor device is an analog sensor.

7. The wind power installation as claimed in claim 1, wherein the at least one sensor device is configured to detect the deviation of the orientation of the pinion axis relative to the predefined reference orientation based on a position change of a reference geometry associated with the drive pinion.

8. The wind power installation as claimed in claim 7, wherein the at least one sensor device is a distance sensor configured to measure a distance between the reference geometry and the at least one sensor device.

9. The wind power installation as claimed in claim 7, wherein the at least one sensor device is a proximity sensor configured to detect a position of the reference geometry.

10. The wind power installation as claimed in claim 1 further comprising a machine carrier, wherein the at least one sensor device is arranged on the machine carrier.

11. The wind power installation as claimed in claim 1, wherein the drive pinion comprises a pinion shaft mounted on a lower pinion shaft bearing, and the at least one sensor device is positioned between the pinion shaft bearing and the drive pinion.

12. The wind power installation as claimed in claim 1, wherein the at least one sensor device is positioned horizontally spaced apart from a tip diameter of the drive pinion.

13. The wind power installation as claimed in claim 1, wherein the at least one sensor device is arranged below the drive pinion and is oriented towards a part of an end face inside a root diameter of the drive pinion.

14. The wind power installation as claimed in claim 1 further comprising a controller configured to receive a signal failure from the at least one sensor device, the signal failure being indicative of the deviation of the orientation of the pinion axis relative to the predefined reference orientation, wherein the deviation is indicative of an existence of a failure.

15. A method comprising:
using a sensor device, monitoring an azimuth drive of a wind power installation, wherein the azimuth drive has a drive pinion which is rotatable about a pinion axis, wherein the pinion axis has a predefined reference orientation, wherein the monitoring comprises using the sensor device to detect a deviation of an orientation of the pinion axis relative to the predefined reference orientation.

16. The method as claimed in claim 15, further comprising:
determining the predefined reference orientation of the pinion axis using the sensor device; or
predefining the predefined reference orientation of the pinion axis.

17. The method as claimed in claim 15, wherein the monitoring further comprises:
detecting the deviation of the orientation of the pinion axis relative to the predefined reference orientation from a position change of a reference geometry associated with the drive pinion.

18. The method as claimed in claim 15, wherein the monitoring further comprises:
converting a physical measurement value into a binary signal by the sensor device; or
converting a physical measurement value into an analog signal by the sensor device.

19. The method as claimed in claim 15, wherein the monitoring further comprises:
measuring, by the sensor device, a distance between a reference geometry and the sensor device; and
detecting a position of the reference geometry by the sensor device.

20. The method as claimed in claim 15, wherein the monitoring further comprises:
generating a failure signal if the deviation of the orientation of the pinion axis of the drive pinion is detected, wherein the failure signal is indicative of a presence of a failure.

21. The method as claimed in claim 15, further comprising:
bringing the wind power installation to a park position, and
shutting down the wind power installation.

22. The method as claimed in claim 21, wherein before bringing the wind power installation to the park position, the method further comprising:
shutting down the azimuth drive coupled to the drive pinion by a controller if the deviation in the orientation of the pinion axis of the drive pinion is detected, wherein the deviation is indicative of a presence of a failure.

* * * * *